(12) United States Patent
Grunikiewicz

(10) Patent No.: US 8,585,469 B2
(45) Date of Patent: Nov. 19, 2013

(54) ADAPTER FOR MOUNTING A TOOL ON AN OSCILLATING DRIVE

(75) Inventor: Peter Grunikiewicz, Stuttgart (DE)

(73) Assignee: C. & E. Fein GmbH (DE)

( * ) Notice: Subject to any disclaimer, the term of this patent is extended or adjusted under 35 U.S.C. 154(b) by 499 days.

(21) Appl. No.: 12/549,719

(22) Filed: Aug. 28, 2009

(65) Prior Publication Data

US 2010/0056029 A1   Mar. 4, 2010

(30) Foreign Application Priority Data

Aug. 29, 2008   (DE) ..................... 20 2008 011 959 U

(51) Int. Cl.
*B24B 45/00*   (2006.01)

(52) U.S. Cl.
USPC ......................................... 451/342; 30/277.4

(58) Field of Classification Search
USPC ................. 451/342, 353, 359, 360; 30/277.4
See application file for complete search history.

(56) References Cited

U.S. PATENT DOCUMENTS

| | | | | |
|---|---|---|---|---|
| 2,586,530 A * | 2/1952 | Godfrey | ........................ | 30/388 |
| 4,577,440 A * | 3/1986 | Junker | ......................... | 451/342 |
| 5,518,440 A * | 5/1996 | Bone | ............................ | 451/342 |
| 6,116,996 A * | 9/2000 | Yanase | .......................... | 451/359 |
| 6,244,943 B1 * | 6/2001 | Bohler et al. | ................. | 451/294 |
| 6,796,888 B2 * | 9/2004 | Jasch | ............................ | 451/342 |
| 6,802,764 B2 * | 10/2004 | Besch | .......................... | 451/344 |
| 6,945,862 B2 * | 9/2005 | Jasch et al. | ................... | 451/342 |
| 7,343,841 B2 * | 3/2008 | Phillips et al. | .................. | 83/481 |
| 7,997,586 B2 * | 8/2011 | Ziegler et al. | ..................... | 279/8 |
| D652,274 S * | 1/2012 | Davidian et al. | ................ | D8/20 |
| 8,151,679 B2 | 4/2012 | Bohne | | |
| 2008/0190259 A1 | 8/2008 | Bohne | | |

FOREIGN PATENT DOCUMENTS

| | | |
|---|---|---|
| CN | 1357431 A | 7/2002 |
| DE | 102004050798 A1 | 4/2006 |
| EP | 1213107 A1 | 6/2002 |
| EP | 1302286 A1 | 4/2003 |
| EP | 2172317 A1 | 4/2010 |

* cited by examiner

*Primary Examiner* — Maurina Rachuba
(74) *Attorney, Agent, or Firm* — St. Onge Steward Johnston & Reens LLC

(57) ABSTRACT

An adapter is disclosed for mounting a tool on an oscillating drive having a drive shaft that can be driven to oscillate about its longitudinal axis, wherein the adapter is passed by a central opening, and has at its drive end at least one positive-locking element for positive connection with the tool, the positive-locking element having the shape of a regular polygon, or a plurality of positive-locking elements arranged on a circle concentric to the center axis, or a plurality of outwardly extending convex projections having rounded tips and being connected with neighboring projections via rounded concave lateral flanks, wherein the positive-locking elements on the drive end are configured for positive-locking connection with a matching positive-locking counter-element on the drive shaft, and wherein the adapter has a second receptacle on its tool end for effecting connection with a tool having a shape different from the first receptacle and being configured as a circle, or as a plurality of positive-locking elements arranged along a circle concentric to the center axis, or as plurality of outwardly extending convex projections with rounded tips and being connected with neighboring projections via rounded concave lateral flanks.

7 Claims, 2 Drawing Sheets

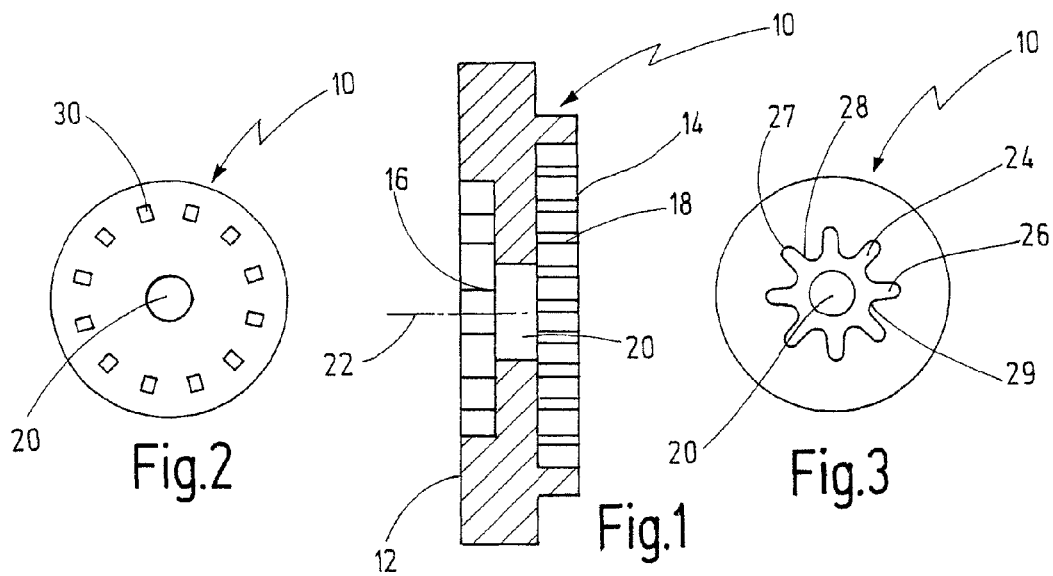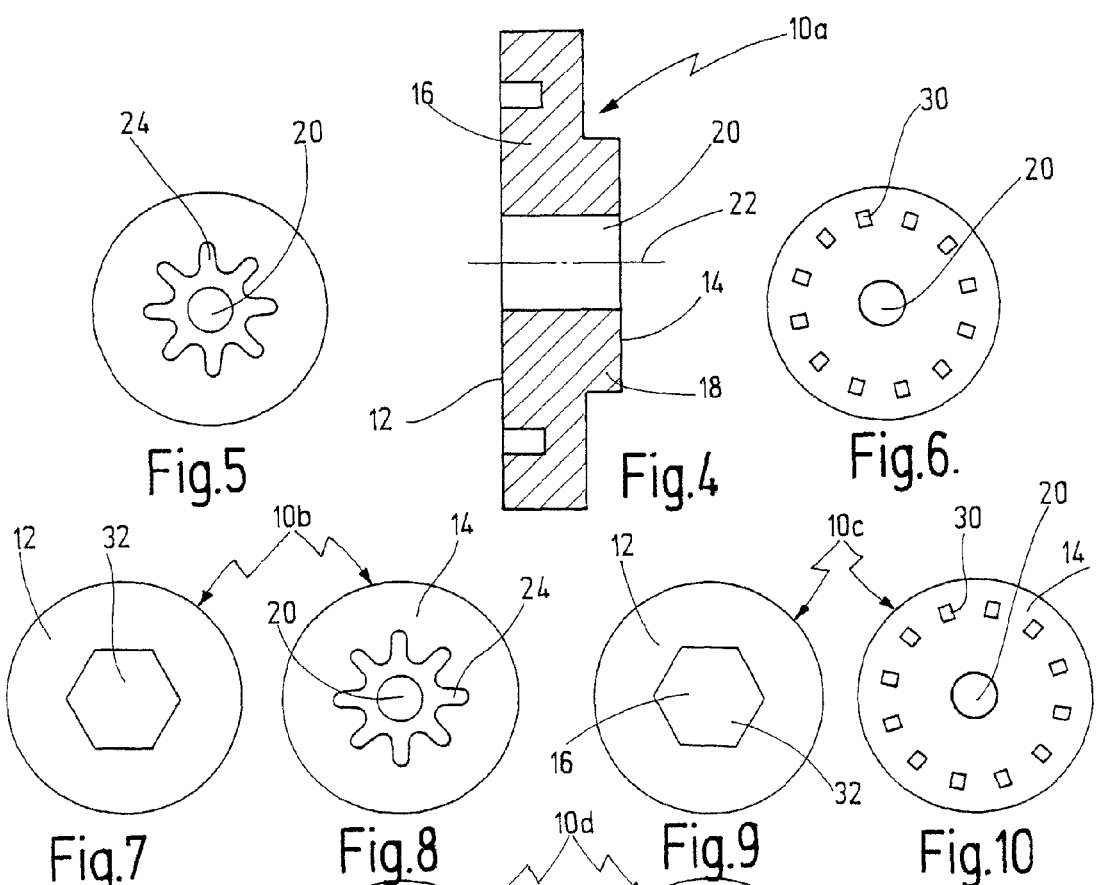

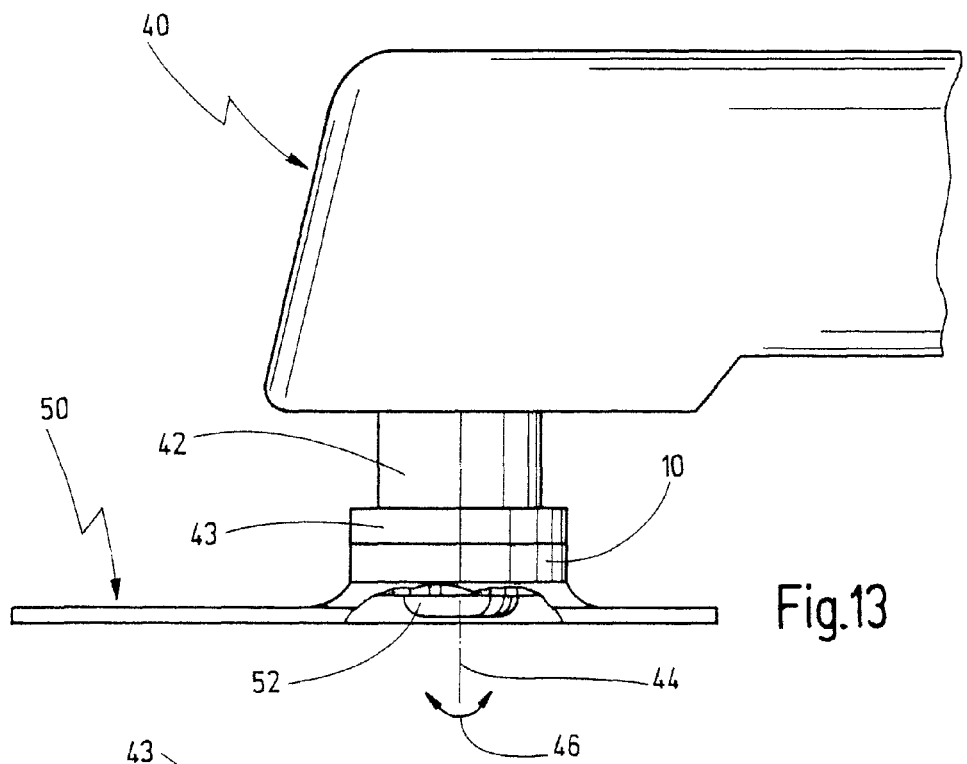
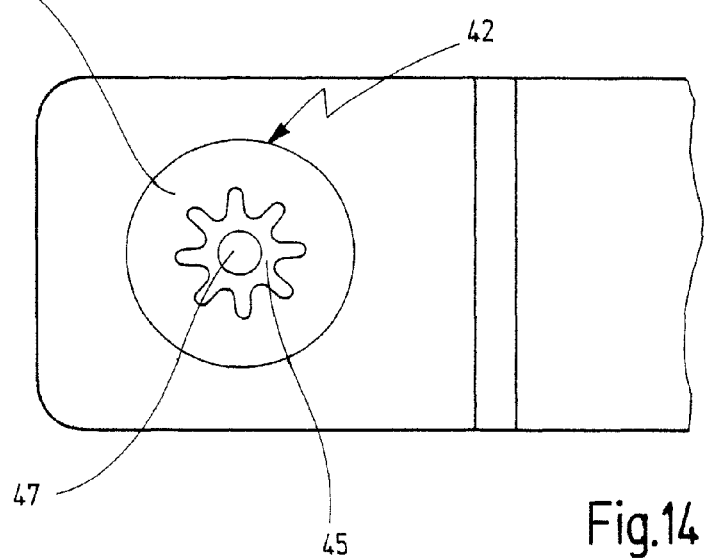
Fig.13
Fig.14

ADAPTER FOR MOUNTING A TOOL ON AN OSCILLATING DRIVE

BACKGROUND OF THE INVENTION

The present invention relates to an adapter for mounting a tool on an oscillating drive having a drive shaft that can be driven to oscillate about its longitudinal axis, wherein the adapter comprises a drive end facing the drive shaft and a tool end facing the tool and is passed by a central opening, wherein the adapter has a first receptacle on the drive end which comprises at least one positive-locking element for connection with the tool, and wherein the adapter has a second receptacle on its tool end facing the tool, for connection with a tool, whose shape differs from that of the first receptacle.

An adapter of that kind is known from U.S. Pat. No. 6,945,862 B2.

The respective adapter shows on its tool side a depression provided with a plurality of outwardly extending convex projections, each having a rounded tip and being connected with neighboring projections via rounded concave lateral flanks. On its machine end, facing the oscillating drive, the adapter shows a raised portion in the form of a regular polygon which is matched to the mounting opening of a tool to be fitted in order to allow a positive-locking connection to be effected.

The adapter is suited to mount and secure a tool, provided with a mounting opening in the form of a regular polygon, on a drive shaft of an oscillating drive provided with a mounting section of the kind described above in the form of a plurality of outwardly extending convex projections, each having a rounded tip.

However, most recently there have been developed still other forms of mounting sections of a drive shaft, or of the respective mounting opening of a tool.

US 2008/0190259 A1, for example, discloses an oscillating drive the drive shaft of which is provided with a plurality of positive-locking elements of trapezoidal cross-section arranged on a circle concentric to the center axis. The respective tools suited for being mounted on that drive shaft comprise correspondingly shaped punched openings and a central opening through which a screw can be screwed into the drive shaft of the oscillating drive. The positive-locking elements simultaneously have the effect to permit the tool to be positively connected with and to be centered on the drive shaft.

Further, there are other forms of tools which are designed either for being connected with the drive shaft of an oscillating drive merely by friction, and which therefore only have a circular mounting opening, or which are configured in the form of a hexagon or a dodecagon.

The great variety of systems available in the market, with respect to the mounting opening and the matching mounting section of the drive shaft, clearly increase the required variety for such wearing parts, with the result of increased costs due to different packings, increased stocking costs or a lesser degree of cost reduction achievable in mass production.

SUMMARY OF THE INVENTION

In view of this it is a first object of the present invention to disclose an adapter that allows tools to be connected with oscillating drives that actually have been designed for other forms of drive shafts.

It is a second object of the present invention to disclose an adapter that allows a user to use tools from different manufacturers on such an oscillating drive.

These and other objects of the invention are achieved by an adapter for mounting a tool on an oscillating drive, having a drive shaft that can be driven to oscillate about its longitudinal axis, wherein the adapter comprises a drive end facing the drive shaft and a tool end facing the tool and is passed by a central opening, wherein the adapter has a first receptacle on the drive end which comprises at least one positive-locking element for positive connection with the tool, wherein the at least one positive-locking element is selected from the group composed of a regular polygon, a plurality of positive-locking elements arranged on a circle concentric to the center axis and a plurality of outwardly extending convex projections, each having a rounded tip and being connected with neighboring projections via rounded concave lateral flanks, and the at least one positive-locking element on the adapter is designed for positive connection with a matching positive-locking counter-element on the drive shaft, and wherein the adapter has a second receptacle on its tool end for effecting connection with the tool, which receptacle has a shape different from the first receptacle and is selected from the group composed of a plurality of positive-locking elements arranged along a circle concentric to the center axis, a plurality of outwardly extending convex projections each having a rounded tip and being connected with neighboring projections via rounded concave lateral flanks, and a circle.

The object of the invention is thus perfectly achieved.

By providing the adapter according to the invention it is now possible for tools, which are configured for being mounted on a drive shaft of an oscillating drive and which, accordingly, cannot be mounted on other forms of drive shafts, to be used also on oscillating drives with a drive shaft of different shape.

This has the effect to clearly reduce the variety of tools and to reduce costs accordingly.

According to another embodiment of the invention, the first receptacle on the machine end is configured as a depression while the second receptacle on the tool end of the adapter is configured as a raised portion.

Conversely, however, it is also possible to configure the first receptacle on the machine end as a raised portion and the second receptacle on the tool end of the adapter as a depression.

Depending on whether a mounting opening or a raised mounting section is provided on the tool for securing it on the drive shaft of the oscillating drive, the adapter may be used in both cases.

According to another embodiment of the invention, the regular polygon is configured as a hexagon or as a dodecagon in star form, as is generally known from U.S. Pat. No. 6,802,764 which is fully incorporated by reference herewith.

According to another embodiment of the invention, the positive-locking elements arranged on a circle concentric to the center axis have a trapezoidal design, as known from US 2008/0190259 A1 which is fully incorporated by reference herewith. Alternatively, they may however also have a rectangular or circular design or any other shape.

According to another embodiment of the invention, the rounded tips of the outwardly extending convex projections and the inner ends of the rounded concave lateral flanks each lie on a circle concentric to the center axis, as generally known from U.S. Pat. No. 6,796,888 which is fully incorporated by reference herewith.

The second receptacle on the tool end preferably is designed for positive-locking connection with the tool. However, the connection may also be a frictional connection in which case the second receptacle has a circular configuration. That design provides the possibility to mount tools exclusively designed for frictional connection.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of certain preferred embodiments, with reference to the drawing. In the drawing FIG. 1 shows an enlarged cross-section of a first embodiment of an adapter according to the invention;

FIG. 2 shows a top view, in reduced scale, of the adapter according to the FIG. 1, viewed from the tool end;

FIG. 3 a bottom view of the adapter according to FIG. 2, viewed from the machine end;

FIG. 4 shows an enlarged cross-section through another embodiment of an adapter according to the invention;

FIG. 5 shows a top view of the adapter according to FIG. 4, in reduced scale and viewed from the tool end;

FIG. 6 shows a bottom view of the adapter according to FIG. 5, viewed from the machine end;

FIG. 7 shows a bottom view of another embodiment of an adapter according to the invention, viewed from the machine end;

FIG. 8 shows a top view of the adapter according to FIG. 7, viewed from the tool end;

FIG. 9 shows a top view of another embodiment of the adapter according to the invention, viewed from the tool end;

FIG. 10 shows a bottom view of the adapter according to FIG. 9, viewed from the machine end;

FIG. 11 shows a top view of another embodiment of the adapter according to the invention, viewed from the tool end; and FIG. 12 shows a bottom view of the adapter according to FIG. 11, viewed from the machine end;

FIG. 13 shows a diagrammatic representation of the gear head area of a conventional oscillating drive, viewed from the side, with a tool mounted and between them the adapter according to the invention; and FIG. 14 shows a bottom view of the oscillating drive according to FIG. 13.

DETAILED DESCRIPTION OF THE PREFERRED EMBODIMENTS

In FIG. 1, a first embodiment of an adapter according to the invention is indicated generally by reference numeral 10. FIG. 1 shows a cross-sectional view of the adapter 10 in enlarged scale. The adapter 10 has a generally cylindrical shape in the form of a relatively flat disk with a center axis 22. The adapter is passed by a cylindrical opening 20. On its machine end 12 facing the oscillating drive, the adapter 10 is provided with a first receptacle 16 in the form of a depression. On its opposite tool end 14 facing the tool, the adapter 10 is provided with a second receptacle 18, configured as an outwardly projecting raised portion, to allow a tool with a correspondingly shaped opening to be mounted. As can be seen in FIG. 3, the form of the first receptacle 16 has a total of eight outwardly extending convex projections 26, each having a rounded tip 27 and being connected with neighboring projections 26 via rounded concave lateral flanks 28. The entire arrangement is symmetrical to the center axis 22 and corresponds to the form known from U.S. Pat. No. 6,945,862 B2 which is incorporated herein in full by reference (compare FIG. 4). The second receptacle 18 on the tool end 14 has the shape known from DE 10 2004 050 798 A1, which is likewise incorporated herein in full by reference. There are provided a total of twelve positive-locking elements 30 of, for example, trapezoidal or circular cross-section, which project outwardly in the form of pins that are equally spaced about a circle concentric to the center axis 22.

The adapter therefore provides the possibility to mount a tool, which is provided with correspondingly shaped recesses for the positive-locking elements 30 according to FIG. 2, on an oscillating drive 40 according to FIG. 13 which has a drive shaft 42 provided with a flange 43 and a positive-locking counter-element 45 according to FIG. 14 that projects outwardly from that flange as a raised portion in the way corresponding to FIG. 3.

FIGS. 13 and 14 show an exemplary embodiment of a tool of known design where a drive shaft 42, which can be driven to oscillate about its longitudinal axis 44, can be driven for oscillation at a high frequency of, for example, 5000 to 25000 oscillations per minute and at a small oscillating angle of, for example, 0.5 to 5°, as is indicated by the double arrow 46. The drive shaft 42 comprises a flange 43 on which is provided a mounting section, projecting in the form of a raised portion, with a positive-locking element 45 of the form shown in FIG. 3. Such a drive shaft 42 allows tools that are provided with a mounting opening of corresponding shape to be mounted directly. However, when tools having a mounting opening of different shape are to be mounted on such a drive shaft 42, this can be effected using the adapter according to the invention. According to FIG. 13, an adapter according to the invention, as shown in FIGS. 1 to 3, is mounted on the drive shaft 42 so that a positive connection is effected with the positive-locking element 45. It is then possible, as shown in FIG. 13, to mount a tool 50, provided with a mounting opening that corresponds to the form shown in FIG. 2, on the tool end 14 of the adapter 10. This means that the tool 50 has a total of twelve trapezoidal recesses all arranged along a circular line so that a receptacle matched to that form is obtained. The tool is then located by a threaded screw 52 which is screwed into a blind hole 47 of the drive shaft 42, through the central opening 20 of the adapter 10. The head of the screw 52 preferably is countersunk in that case so that an abrasive paper, for example, can be fixed on the surface of the tool 50 using a Velcro fastener. The tool 50 may, for example, have a triangular shape with rounded corners and rounded convex lateral edges. However, a tool of any desired shape, a knife a spatula, or the like are imaginable as well.

Some other variants of the adapter according to the invention are illustrated in FIGS. 4 to 12 and will be briefly described hereafter.

FIGS. 4 to 6 show an adapter 10a whose ends have been interchanged compared with the adapter described before with reference to FIGS. 1 to 3. This means that the first receptacle 16 on the tool end now has the form of a depression and is suited for being mounted on a drive shaft of the design known from DE 10 2004 050 798 A1. The second receptacle 18 on the tool end of the adapter 10a is configured for mounting tools with a mounting opening of the form shown in FIG. 3.

FIGS. 7 and 8 show another adapter 10b where the first receptacle on the machine end is configured as a hexagon 32 and a projecting raised mounting section of the form illustrated in FIG. 3 is again provided on the tool end 14.

FIGS. 9 and 10 show another adapter 10c where a hexagon-shaped receptacle 16 is provided on the tool end 12, while twelve positive-locking elements 30 of the form and in the arrangement illustrated in FIG. 2 are provided on the machine end 14.

Another variant of the adapter according to the invention is illustrated in FIGS. 11 and 12 and is generally indicated by 10d. In that case, a first receptacle in the form of a depression as illustrated in FIG. 3 is provided on the machine end 12 while only a circular receptacle 14 is provided on the opposite end.

Such an adapter 10d is used when the tool to be used is to be mounted by a frictional connection only, without any positive-locking effect. Again, the tool is secured by a securing screw that is screwed into the blind hole of the oscillating drive 40 through the adapter 10d and through the tool.

What is claimed is:

1. An adapter for mounting a tool on an oscillating drive having a drive shaft configured to be oscillatingly driven about its longitudinal axis; said adapter comprising:
   a drive end facing said drive shaft;
   a tool end facing the tool;
   a central opening passing through said adapter and defining a center axis;
   a first receptacle arranged on said drive end and comprising at least one positive-locking element configured for positive connection with said tool;
   a second receptacle arranged on said tool end for effecting connection with a tool;
   wherein said at least one positive-locking element has a plurality of outwardly extending convex projections, each having a rounded tip arranged on a circle concentric to said center axis and being connected with neighboring projections via rounded concave lateral flanks, said at least one positive-locking element being configured for positive-locking connection with a matching positive-locking counter-element provided on said drive shaft, wherein said first receptacle on said machine end is configured as a recess;
   said second receptacle having a shape different from said first receptacle and having a plurality of positive-locking elements arranged isolated from each other on a circle concentric to said center axis, wherein said second receptacle on said tool end is configured as a raised portion;
   wherein said second receptacle provided on said tool end is configured for positive-locking connection with said tool.

2. The adapter of claim 1, wherein at least one of said positive-locking elements arranged on a circle concentric to said center axis has a shape selected from the group consisting of trapezoidal, rectangular, and circular.

3. An adapter for mounting a tool on an oscillating drive having a drive shaft configured to be oscillatingly driven about its longitudinal axis; said adapter comprising:
   a drive end facing said drive shaft;
   a tool end facing the tool;
   a central opening passing through said adapter and defining a center axis;
   a first receptacle arranged on said drive end and comprising at least one positive-locking element configured for positive connection with said tool;
   a second receptacle arranged on said tool end for effecting connection with a tool;
   wherein said at least one positive-locking element is selected from the group consisting of a plurality of positive-locking elements arranged isolated from each other on a circle concentric to said center axis, and a plurality of outwardly extending convex projections, each having a rounded tip arranged on a circle concentric to said center axis and being connected with neighboring projections via rounded concave lateral flanks, said at least one positive-locking element being configured for positive-locking connection with a matching positive-locking counter-element provided on said drive shaft, wherein said first receptacle on said machine end is configured as a raised portion;
   said second receptacle having a shape different from said first receptacle and being selected from the group consisting of a plurality of positive-locking elements arranged isolated from each other on a circle concentric to said center axis, a plurality of outwardly extending convex projections each having a rounded tip arranged on a circle concentric to said center axis and being connected with neighboring projections via rounded concave lateral flanks, wherein said second receptacle on said tool end is configured as a recess.

4. The adapter of claim 3, wherein at least one of said positive-locking elements arranged on a circle concentric to said center axis has a shape selected from the group consisting of trapezoidal, rectangular, and circular.

5. The adapter of claim 3, wherein said second receptacle provided on said tool end is configured for positive-locking connection with said tool.

6. The adapter of claim 5, wherein at least one of said positive-locking elements arranged on a circle concentric to said center axis has a shape selected from the group consisting of trapezoidal, rectangular, and circular.

7. The adapter of claim 6, wherein said second receptacle provided on said tool end is configured for positive-locking connection with said tool.

* * * * *